(12) United States Patent
van der Kamp et al.

(10) Patent No.: US 11,951,065 B2
(45) Date of Patent: Apr. 9, 2024

(54) APPARATUS FOR GENERATING A RECIPROCATING ROTARY MOTION

(71) Applicant: KONINKLIJKE PHILIPS N.V., Eindhoven (NL)

(72) Inventors: Gertrude van der Kamp, Den Helder (NL); Pieter Johannes Bax, Drachten (NL); Theodoor Stolk, Langezwaag (NL); Hamid Ziaimehr, Plymouth, MA (US)

(73) Assignee: Koninklijke Philips N.V., Eindhoven (NL)

( * ) Notice: Subject to any disclaimer, the term of this patent is extended or adjusted under 35 U.S.C. 154(b) by 734 days.

(21) Appl. No.: 17/068,956

(22) Filed: Oct. 13, 2020

(65) Prior Publication Data
US 2021/0106495 A1  Apr. 15, 2021

Related U.S. Application Data

(60) Provisional application No. 62/915,313, filed on Oct. 15, 2019.

(51) Int. Cl.
*A61H 23/02* (2006.01)
*A61H 11/00* (2006.01)
(Continued)

(52) U.S. Cl.
CPC ......... *A61H 23/0254* (2013.01); *A61H 11/00* (2013.01); *A61H 23/006* (2013.01);
(Continued)

(58) Field of Classification Search
CPC .............. A61H 23/0254; A61H 1/00; A61H 2011/005; A61H 2011/1619;
(Continued)

(56) References Cited

U.S. PATENT DOCUMENTS 2,790,095 A    4/1957  Alphonsus et al.
3,394,295 A *  7/1968  Cory ...................... H02K 41/02
                                              310/46
(Continued)

FOREIGN PATENT DOCUMENTS

EP    1727262 A2 * 11/2006  ............. H02K 7/063
WO    2019148289 A1   8/2019

OTHER PUBLICATIONS

International Search Report for PCT/EP2020/078084 dated Oct. 7, 2020.

*Primary Examiner* — Tu A Vo
*Assistant Examiner* — Kelsey E Baller
(74) *Attorney, Agent, or Firm* — Daniel H. Brean; Andrew M. Gabriel

(57) ABSTRACT

An apparatus for generating a rotary reciprocating motion comprises an input shaft which is driven with unidirectional rotation and an output shaft for delivering reciprocating rotary motion. A first magnetic or ferromagnetic ring is disposed about a rotation axis fixed to the input shaft and a second magnetic or ferromagnetic ring is disposed about the rotation axis fixed to the output shaft. At least one is formed as an arrangement of permanent magnets. The first and second rings are disposed one within the other around the rotation axis. The magnetic coupling between the rings in combination with the effect of an output load results in the desired reciprocating motion of the output shaft.

13 Claims, 8 Drawing Sheets

(51) Int. Cl.
     *A61H 23/00*     (2006.01)
     *A61H 31/00*     (2006.01)
     *H02K 7/065*     (2006.01)
(52) U.S. Cl.
     CPC ....... *A61H 23/0218* (2013.01); *A61H 31/006* (2013.01); *H02K 7/065* (2013.01); *A61H 2011/005* (2013.01); *A61H 2201/1215* (2013.01); *A61H 2201/1619* (2013.01); *A61H 2201/165* (2013.01); *A61H 2205/082* (2013.01)
(58) Field of Classification Search
     CPC ...... A61H 2011/1215; A61H 2011/165; A61H 2205/082; A61H 31/006; A61H 31/00; A61H 31/004; A61H 31/008; H02K 7/065; Y10T 74/18056; Y10T 74/18024; F16H 19/00; F16H 19/001; F16H 19/02; F16H 19/043; F16H 23/00
     USPC .......................................................... 74/25
     See application file for complete search history.

(56) References Cited

U.S. PATENT DOCUMENTS

| | | | | |
|---|---|---|---|---|
| 6,066,106 | A  * | 5/2000 | Sherman | A61H 31/008 601/134 |
| 6,447,465 | B1 * | 9/2002 | Sherman | A61H 31/005 601/44 |
| 6,478,681 | B1 * | 11/2002 | Overaker | A61B 17/1624 464/29 |
| 7,516,743 | B2 | 4/2009 | Hoffman | |
| 8,487,484 | B1 * | 7/2013 | Miller, Jr | H02K 7/06 310/15 |
| 2006/0122631 | A1 | 6/2006 | Kertz | |
| 2008/0036303 | A1 | 2/2008 | Stevens | |
| 2009/0033169 | A1 | 2/2009 | Takeuchi | |
| 2010/0004571 | A1* | 1/2010 | Nilsson | A61H 31/006 601/41 |
| 2017/0105897 | A1 | 4/2017 | Harris | |
| 2018/0140506 | A1 | 5/2018 | Cusumano | |

* cited by examiner

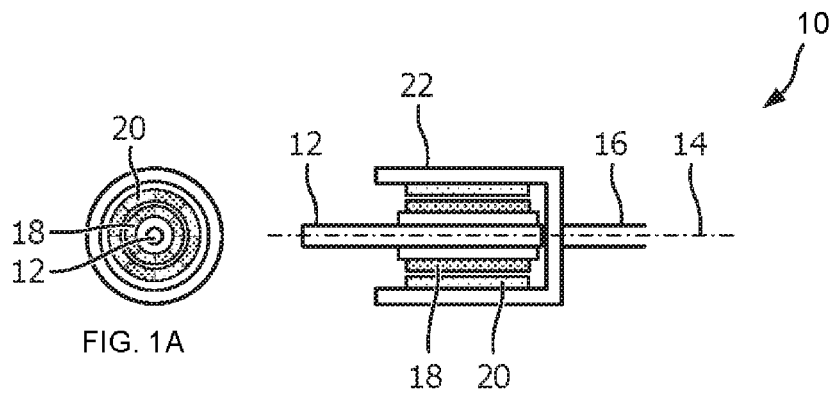
FIG. 1A
FIG. 1
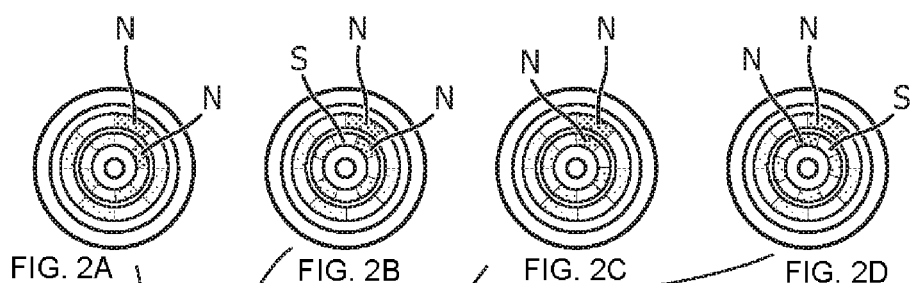
FIG. 2A  FIG. 2B  FIG. 2C  FIG. 2D
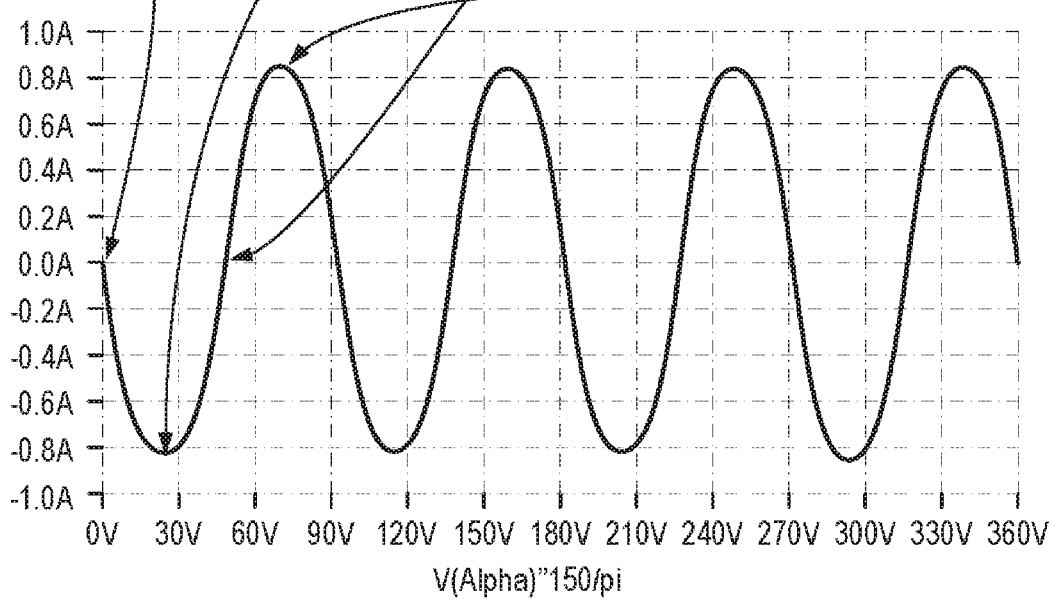
V(Alpha)"150/pi
FIG. 2

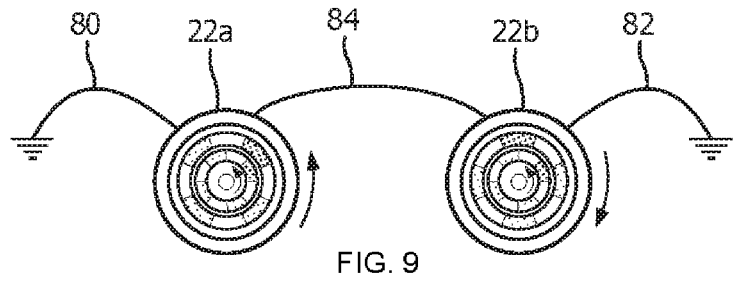
FIG. 9
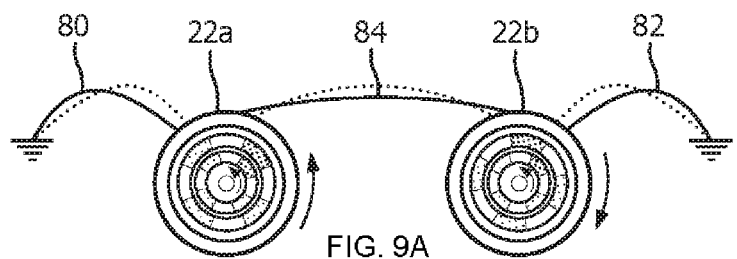
FIG. 9A
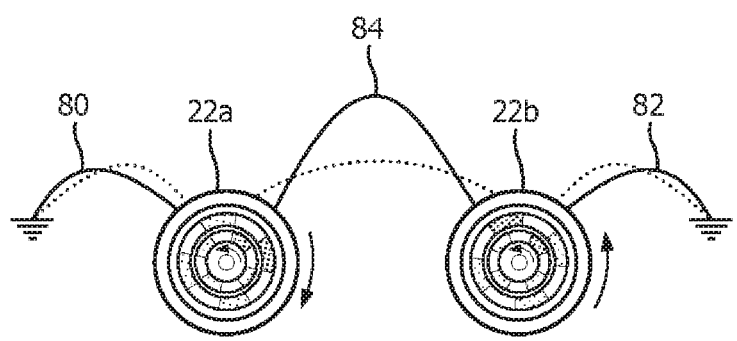
FIG. 9B
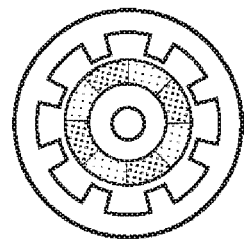 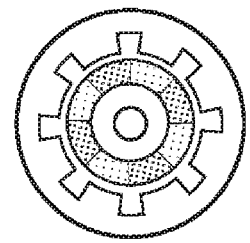
FIG. 10A      FIG. 10B

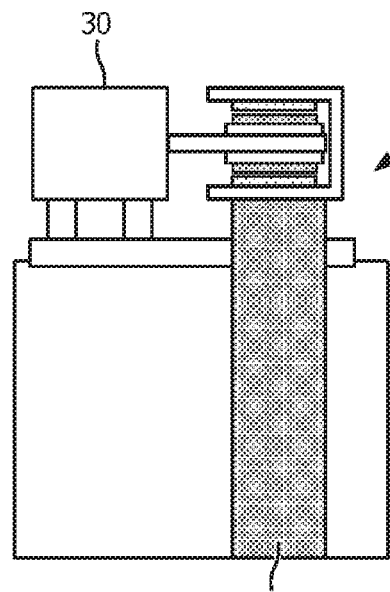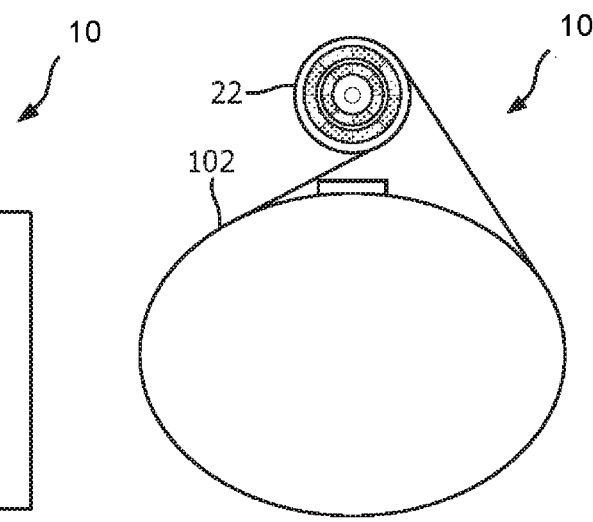
FIG. 11　　　　　　　　　FIG. 11A
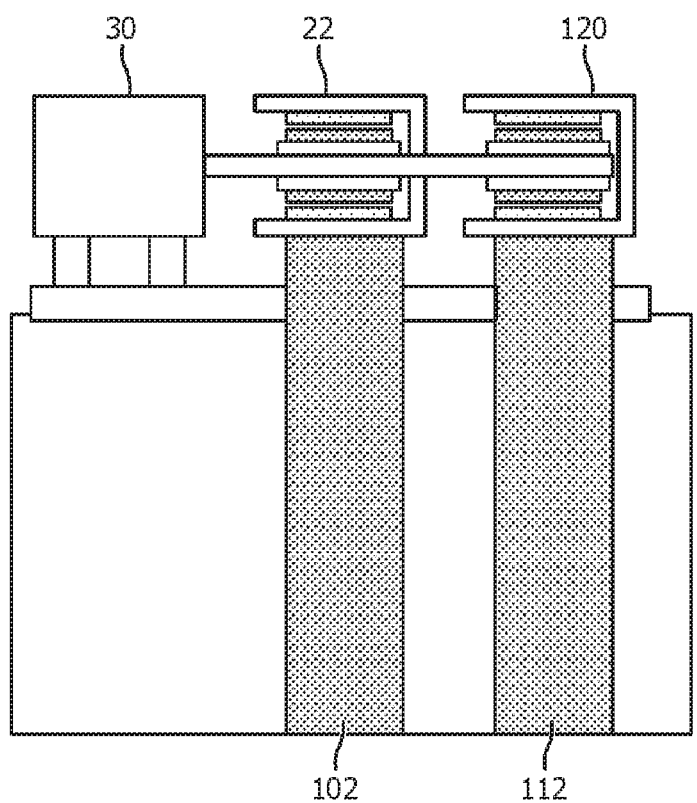
FIG. 12

APPARATUS FOR GENERATING A RECIPROCATING ROTARY MOTION

CROSS-REFERENCE TO RELATED APPLICATIONS

This patent application claims the priority benefit under 35 U.S.C. § 119(e) of U.S. Provisional Application No. 62/915,313, filed on Oct. 15, 2019, the contents of which are herein incorporated by reference.

FIELD OF THE INVENTION

The invention relates to apparatus for generating a reciprocating rotary motion, for example for use in creating a vibratory motion, such as for use in a chest compression system or a body manipulation (e.g. massage) system.

BACKGROUND OF THE INVENTION

There are many instances in which reciprocating rotary motion may be of interest. By this is meant a rotation back and forth with rotation in each direction typically less than a full revolution.

Examples where such motion may be of interest include toothbrush actuators, tooth flossing devices, skin care appliances, and massage appliances such as heart massage devices.

There is a need for a system which is able to generate reciprocating rotational motion, which can be implemented at low cost and/or small size.

SUMMARY OF THE INVENTION

The invention is defined by the claims.

According to examples in accordance with an aspect of the invention, there is provided an apparatus for generating a rotary reciprocating motion, comprising:

an input shaft having a rotation axis;

a drive motor for providing unidirectional rotation of the input shaft about the rotation axis;

an output shaft for delivering reciprocating rotary motion about the rotation axis, wherein the output shaft is for coupling to a load which limits the rotation of the output shaft thereby to prevent unidirectional rotation of the output shaft;

a first magnetic or ferromagnetic ring disposed about the rotation axis, rotationally fixed to the input shaft; and a second magnetic or ferromagnetic ring disposed about the rotation axis, rotationally fixed to the output shaft, wherein the first and second rings are disposed one within the other around the rotation axis and wherein at least one of the first and second rings comprises an annular sequence of permanent magnetic elements.

This apparatus converts continuous rotary motion of an input shaft to a reciprocating rotary motion of an output shaft. The alignment between two magnet or ferromagnetic rings varies as the input and output shafts adopt different relative angular positions. In this way, a resisting force is dependent on the relative angular orientation. This can be used to set the output shaft into an oscillation induced by the rotation of the input shaft. This provides a compact design, basically of two concentric magnet or ferromagnetic rings. The design can easily be scaled to the forces and torque needed.

The load to be driven by the output shaft forms part of the oscillatory mechanical circuit, and prevents to the two rings simply rotating in unison.

The or each annular sequence of permanent magnetic elements for example comprises an annular sequence of alternating magnetic poles, i.e. a sequence of north and south poles. However, other arrangements are possible, with different magnetic field distributions buts not necessarily opposite poles.

The first and second rings may each comprise an annular sequence of permanent magnetic elements or else one of the first and second rings comprises an annular sequence of permanent magnetic elements and the other of the first and second rings comprises a sequence of ferromagnetic poles. When only one ring has permanent magnetic elements, a field is induced in the opposing ring, which comprises a ferromagnetic ring having a series of poles (e.g. formed as projecting teeth).

In one example, there are two magnet rings each comprising 4 pole pairs, hence 8 magnets. There is then a 45 degree offset between a maximum (attraction) and minimum (repulsion) magnetic coupling between the two magnet rings.

An axial relative alignment along the rotation axis, between the first and second rings, may adjustable to a desired relative alignment for setting an output torque level.

In this way, a single design of the apparatus may be set to different torque levels. The axial alignment sets the area of overlap between the first and second rings and thereby sets the forces of attraction and repulsion between the magnet rings or between a magnet ring and ferromagnetic ring.

An axial relative alignment along the rotation axis, between the first and second rings, may instead be set to a relative alignment for setting an output force level along the rotational axis. The relative alignment between the two rings also alters a force on the output shaft in the axial direction. Thus, both a reciprocating rotary motion and a cyclic axial force may be generated.

The apparatus may further comprise a third magnetic or ferromagnetic ring, wherein the second and third magnet rings are both disposed within or around the first magnet ring, wherein the first and second magnet rings define a coupling which is in anti-phase with a coupling defined by the first and third magnet rings.

In this way, a torque needed to drive the input shaft to pull apart magnets of the first and second rings is offset by a force of attraction between the first and third rings.

The torque needed to drive the input shaft is thus more uniform over time and is also reduced by offsetting the two magnetic couplings against each other.

A second output shaft may be provided, wherein the third ring is disposed about the rotation axis, rotationally fixed to the second output shaft, and wherein the first and second output shafts are for coupling to a load which limits the rotation of the first and second output shafts thereby to prevent unidirectional rotation of the first and second output shafts.

Thus, the load to be driven by the output shaft again forms part of the oscillatory mechanical circuit, and acts on both pairs of rings. The first and second output shafts are for example coupled together by a further load.

The invention also provides a chest compression device comprising:

an apparatus as defined above; and a chest compression belt for positioning around the chest of a subject, connected at opposite ends to the output shaft.

The apparatus provides a compact arrangement for the chest compression device, for example avoiding the need for a separate base station so the device can be directly located on the chest. It can be lightweight, small in size, and energy efficient. It may for example be battery operated.

The apparatus enables operation at a greater range of frequencies, for example at higher frequencies. It may also be programmable based on the drive scheme of the motor to generate a specific desired pressure pulse profile.

The apparatus may further comprise a further output shaft for delivering reciprocating a second rotary motion about the rotation axis, and the chest compression device then further comprises a second belt connected at opposite ends to the further output shaft. This enables a second belt to be driven, by incorporating a further output shaft (but the same input shaft).

A friction reducing arrangement is for example between the belt or belts and the subject.

The invention also provides a body manipulation device comprising:

a set of apparatuses each as defined above ; and a set of force applicators for applying a force to a subject, each force applicator being driven by an associated one of the apparatuses, wherein each force applicator comprise a pair of spring loads connected to diametrically opposing locations of the output shaft.

Each output shaft drives two spring loads, which induce the reciprocating motion. The angular position then causes the spring load to project against the subject, to perform a force application, for example for massaging.

A belt may be provided around the set of apparatuses and force applicators.

The invention also provides a method of generating a rotary reciprocating motion, comprising:

driving an input shaft with unidirectional rotation about a rotation axis, thereby rotating a first magnetic or ferromagnetic ring, disposed about the rotation axis;

inducing rotation of a second magnetic or ferromagnetic ring, disposed about the rotation axis, by magnetic coupling to the first magnet ring, wherein at least one of the first and second rings comprises an annular sequence of permanent magnetic elements; and delivering reciprocating rotary motion about the rotation axis of an output shaft coupled to rotation of the second ring.

The output shaft is preferably coupled to a load which limits the rotation of the output shaft thereby to prevent unidirectional rotation of the output shaft.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 1 shows an apparatus for generating a rotary reciprocating motion;

FIG. 2 shows a set of relative rotational positions of two magnet rings caused by a single rotation of the input shaft;

FIG. 9 shows different periods of time during the operation of the apparatus of FIG. 8;

FIGS. 10A and 10B show designs for the concentric rings using one magnetic ring and one ferromagnetic ring;

FIG. 11 shows a chest compression device comprising the apparatus of FIG. 3;

FIG. 12 shows an example with a further output shaft for delivering a second reciprocating rotary motion about the rotation axis, for a second chest compression belt;

DETAILED DESCRIPTION OF THE EMBODIMENTS

Figure 3:
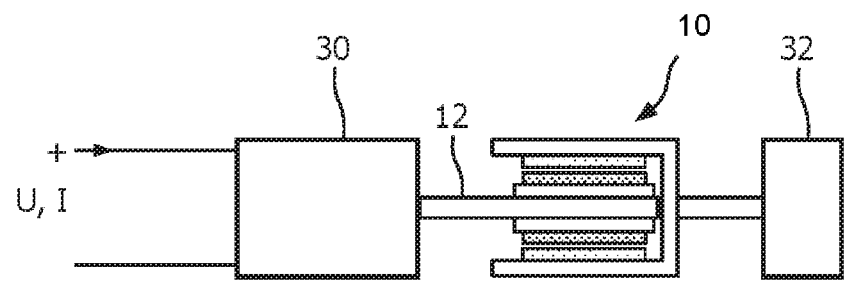
FIG. 3 shows that a simple DC motor is used to drive the apparatus.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an apparatus for generating a rotary reciprocating motion comprises an input shaft which is driven with unidirectional rotation and an output shaft for delivering reciprocating rotary motion. A first magnetic or ferromagnetic ring is disposed about a rotation axis fixed to the input shaft and a second magnetic or ferromagnetic ring is disposed about the rotation axis fixed to the output shaft. The first and second rings are disposed one within the other around the rotation axis. At least one is formed as an arrangement of permanent magnets. The magnetic coupling between the rings in combination with the effect of an output load results in the desired reciprocating motion of the output shaft.

The invention relates generally to an apparatus for generating reciprocating rotary motion. However, one aspect of the invention relates in particular to the use of such an apparatus within a high frequency chest compression device. This device is for treatment of patients who suffer from cystic fibrosis, COPD, Bronchitis or Bronchiectasis, and hence have difficulty breathing.

In the case of chronic bronchitis, the bronchi are always inflamed. This results in excess mucus production and breathing is made difficult. In the case of cystic fibrosis, the mucus is tougher and therefore it is not capable of transporting the waste products and enzymes. This results in accumulations of this tough mucus, which causes serious problems for the patient.

Transporting the mucus out of the airway is essential for the wellbeing of these types of patient.

The traditional treatment for this problem involves percussion, which is to massage by gently drumming with cup shaped hands on the patient. More recently, high frequency frequency chest compression (HFCC) devices have been developed. Compared to manual therapy, a HFCC vest achieves much better results and changes the life expectancy of patients with cystic fibrosis drastically.

When the patient has put on the vest, air will inflate the vest and this creates an air pocket around the chest, some of which is then released. This creates a cyclic pulsing for example at around 5-15 Hz.

Due to the pulsating air in the vest, the lungs are compressed and push some air in and out. Cilia will transport the mucus outwards due to the air movement. In addition to the air movement, the vibration of the lung tissue due to the HFCC vest is beneficial to the patient. The vibration loosens up the bonds inside the mucus so that it can flow more easily.

In studies, it has been concluded that the air flow seems more dominant than the vibrating tissue.

Since the actuation of the vest is achieved via an airflow, the device is typically rather large. The pump is for example in a separate base station which is connected to the vest via large hoses to transport the air. The base station is plugged in to an electric supply. The result is that the device is stored in a large suitcase on wheels for transportation, so is not a truly portable solution. The operating frequency of the device is also limited by the air flow characteristics, and the shape of the pressure pulse is not easily adapted.

This aspect of the invention is thus based on the concept that a reciprocating rotary motion may be used to tighten and loosen a belt for use in a HFCC system.

Returning to the more general concept of an apparatus for generating reciprocating motion, FIG. 1 shows an apparatus 10 for generating a rotary reciprocating motion. The structure is shown in end view on the left and in cross section on the right.

The apparatus comprises an input shaft 12 having a rotation axis 14. A drive motor, not shown in FIG. 1, is used to provide unidirectional rotation of the input shaft 12 about the rotation axis.

An output shaft 16 is provided for delivering reciprocating rotary motion about the rotation axis 14.

The input shaft and output shaft are coupled by a magnetic arrangement formed of two concentric magnetic or ferromagnetic rings. At least one ring is magnetic (i.e. formed as a magnet ring of permanent magnets). If only one ring is formed as a magnet ring, then the other is a ferromagnetic ring and is formed as a series of ferromagnetic poles.

Examples will first be presented based on the use of two concentric permanent magnet rings.

A first magnet ring 18 is disposed about the rotation axis and is rotationally fixed to the input shaft 12. It comprises a first annular sequence of alternating magnetic poles. For example, the dark shaded area are North poles and the light shaded areas are South poles. A second magnet ring 20 is disposed about the rotation axis, but rotationally fixed to the output shaft 16. The second magnet ring comprises a second annular sequence of alternating magnetic poles shown with the same notation.

In the example shown, the first magnet ring is mounted concentrically around the outside of the input shaft. The second magnet ring is mounted concentrically at the inside surface of an annular housing 22 which is connected to the output shaft 16.

Thus, the first and second magnet rings 18, 20 are disposed one within the other around the rotation axis. In the example shown, they align fully, hence overlap fully, along the rotation axis.

The magnet rings may have the same number of magnets, so that they can be fully rotationally aligned with all North poles of one magnet ring radially aligned with the South poles of the other magnet ring. This is a stable configuration, which would be maintained in the absence of an external force to provide relative rotation (as discussed below). This stable state is represented in FIG. 1.

The example of FIG. 1 has four pole pairs in each magnet ring. Of course, there may be a different number of magnets in the two rings. Furthermore, there may be a different number of magnets in one ring compared to the other. The relationship between the poles in one magnet ring and the other will influence the resulting torque curve delivered to the output shaft 16.

If the same poles are instead aligned, an instable state is reached, by which the magnetic forces will tends to provide relative rotation back to the stable state.

The apparatus converts continuous rotary motion of the input shaft to a reciprocating rotary motion of an output shaft, based on the slippage between the two magnet rings. In particular, the output shaft is subjected to an external load. As a result, the alignment between two magnet rings varies as the input shaft rotates. A resisting force varies in dependence on the relative angular positions. This varying resisting force results in the output shaft performing an oscillation induced by the rotation of the input shaft. Since the motor can drive the input shaft continuously, it can be relatively small and light weight.

The output shaft is coupled to a load which limits the rotation of the output shaft. In this way, unidirectional rotation of the output shaft is prevented. The load forms part of the oscillatory mechanical circuit, and prevents to the two magnet rings simply rotating in unison.

FIG. 2 shows a set of relative rotational positions of the two magnet rings caused by a single rotation of the input shaft. It also shows the resulting torque curve, of torque vs. angular rotor position.

The first image at the top left show the stable state mentioned above. No torque is generated.

The first (inner, input side) magnetic ring is then rotated by 45 degrees anti-clockwise to provide the second orientation shown. There is force on the second magnetic ring trying to rotate it anti-clockwise back to the stable state. This is shown as a negative torque. It reaches a maximum when there is 50% overlap.

Further rotation of the input shaft reduces the torque magnitude back to zero. In the third orientation, the instable state is reached. There is zero torque again because the forces are axial rather than radial.

Further rotation of the input shaft leads to the fourth orientation shown with a positive torque. The second magnet ring is trying to rotate clockwise to the nearest stable state. There are thus four periods of the torque curve.

The points where the torque is zero thus define stable points when the gradient is negative and instable points when the gradient is positive. Between these points. positive or negative torque is created.

FIG. 3 shows that a simple DC motor 30 is connected to the input shaft and hence to the first magnet ring. The second magnet ring and hence the output shaft is connected to a load 32 which prevents it from fully rotating. In this way, a pulsating torque is delivered to the load 32.

Figure 4:
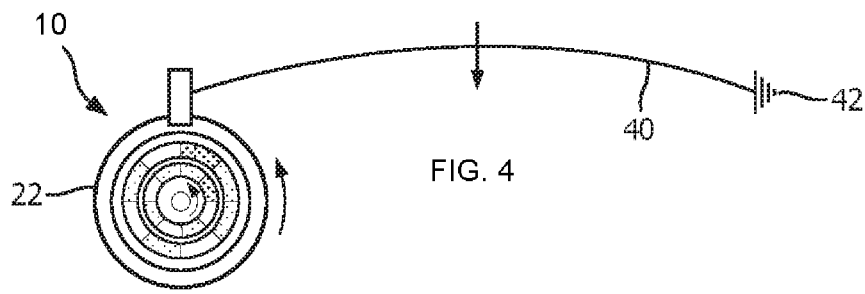
FIG. 4 shows the output shaft connected to an output load.
Figure 4A:
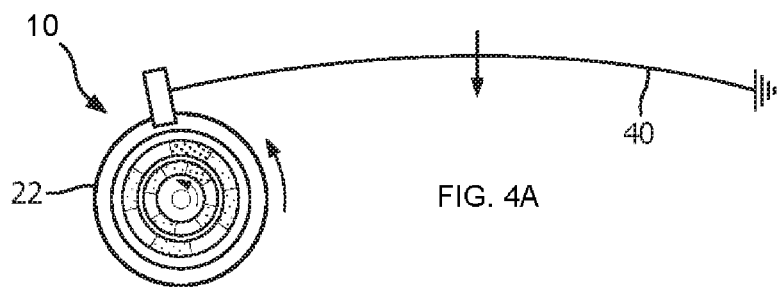
Figure 4B:
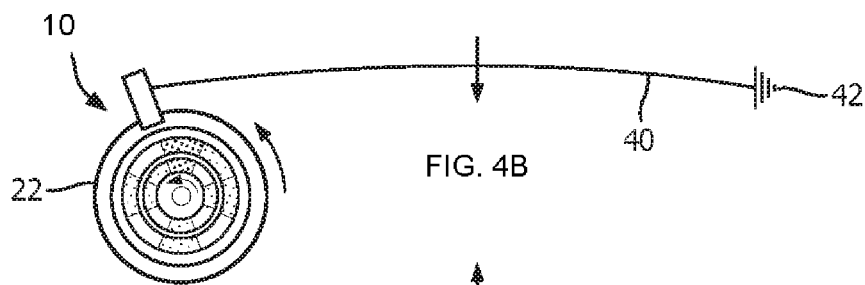
Figure 4C:
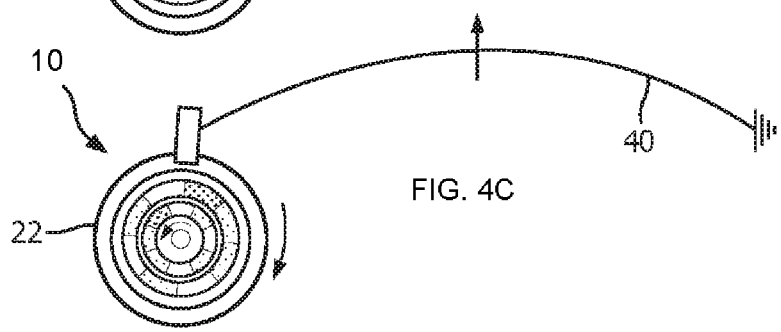

FIG. 4 shows the output shaft (in particular the annular housing 22) connected to an output load 40 in the form of a spring which connects to mechanical earth 42. It shows four sequential positions of the output shaft caused by rotation of the input shaft.

The top image shows the starting situation, in which the torque is zero, and the spring 40 is not deformed.

The input shaft and hence first magnet ring is then is rotated by the motor, and the second magnet ring and hence output shaft tries to follow as much as possible, however, it is hampered by the spring as can be seen in the second image.

At some point in time, the coupling between the magnet rings reaches the instable state as shown in the third image. At this time, the apparatus cannot deliver any torque, but the spring is delivering a return force. This means that a high negative torque is generated; and the output shaft and second magnet ring is launched backwards (clockwise).

In the fourth image, the output shaft and second magnet ring is in a flyback position. The angle of the output shaft is negative, and the spring is apply a restoring force in the opposite direction (i.e. pushing the output shaft anti-clockwise).

The outer magnet ring is caught up by the inner magnet ring (with anew North to South pole alignment), and the cycle repeats.

In this example the outer magnet ring only reaches the first instable point. However, it can also be arranged that the flyback mechanism causes the second magnet ring to cross more than one instable point. This depends on the nature of the restoring force generated by the load, i.e. the spring in this example.

Note that the spring may itself be the load that is to be driven with the reciprocal motion. However, the spring may simply serve to create the reciprocal motion, and the load driven by the output shaft may be separate, for example a lighter load which does not generate sufficient resistance to induce the reciprocating motion. This applies to all examples.

The frequency of the reciprocating output rotation can easily be changed by the rotational speed of the driving motor 30. However, the amplitude of the torque pulse is fixed in the drive train of FIG. 3.

Figure 5:
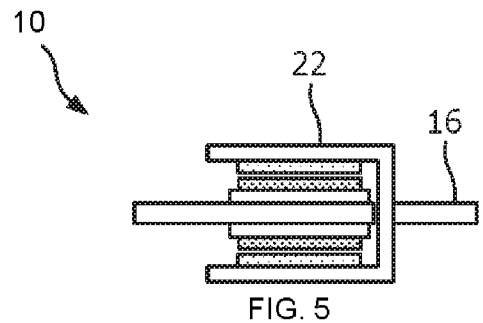
FIG. 5 shows how the output torque can be adjusted.
Figure 5A:
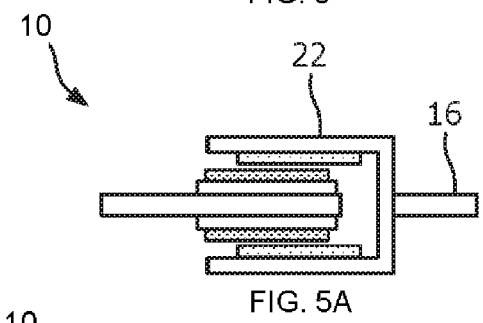
Figure 5B:
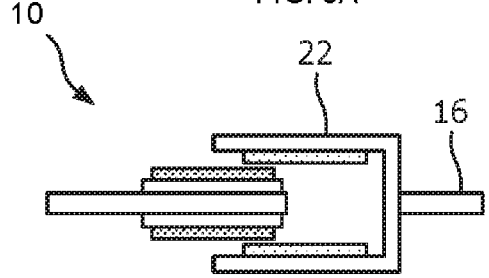

The torque can however be varied by making the axial position of the second magnet ring variable with respect to the first magnet ring, as shown in FIG. 5.

The top image shows the two magnet rings fully overlapping, hence generating a maximum magnetic torque when the rotational orientation is away from the stable points.

The second image shows an adjustment of the relative axial positions (along the rotation axis) giving a reduced magnetic torque due to the reduced area of overlap between the magnetic rings. The bottom image shows a further reduction in the overlap area.

In this way the torque can be adapted to the load. A single design of the apparatus may be set to different torque levels.

An axial relative alignment along the rotation axis, between the first and second magnet rings, may instead be set to a relative alignment for setting an output force level along the rotational axis. The relative alignment between the two magnet rings also alters a force on the output shaft in the axial direction. Thus, both a reciprocating rotary motion and a cyclic axial force may be generated.

Figures 6, 6A:
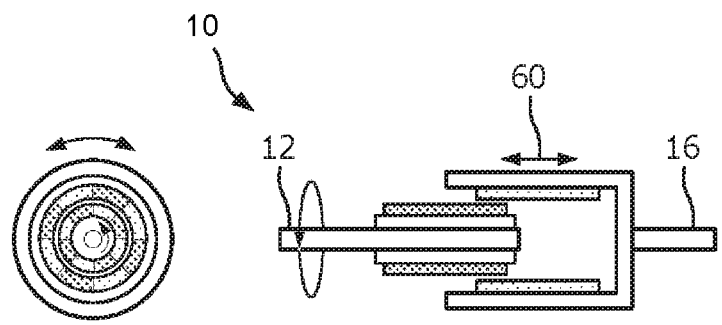
FIG. 6 shows how both a reciprocating rotary motion and a cyclic axial force may be generated.

This concept is shown in FIG. 6. The misalignment axially means there is a force, represented by arrow 60 which is pulling the first magnet ring in or pushing it out, depending on the relative angular position. In the stable state, the first magnet ring will be pulled in whereas in the instable state it will be pushed out.

This results in a double motion actuator, which delivers both a vibrational torque and force. This double motion is of interest in various applications, for example abrasive tools which impart a rotary torque as well as an axial force. An example is for dental flossing.

The examples above make use of a single first magnet ring (functioning an an input rotor) and a single second magnet ring (functioning as an output rotor).

Figure 7:
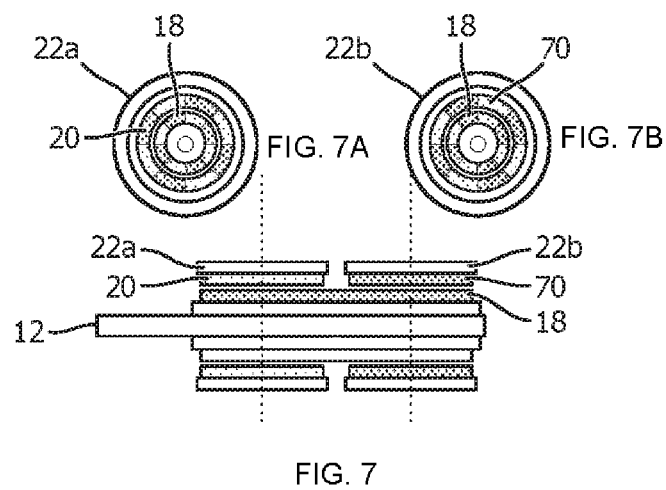
FIG. 7 shows a modification which uses a third magnet ring.

As shown in FIG. 7, the apparatus may further comprise a third magnet ring 70. The second and third magnet rings 20, 70 are both disposed around the first magnet ring 18. The third magnet ring again comprises an annular sequence of alternating magnetic poles.

There are then two annular housings 22a, 22b (functioning as two output shafts).

The magnetic coupling formed by the first and second magnet rings 18,20 is in anti-phase with the coupling defined by the first and third magnet rings 18, 70. To maintain this relationship, a coupling is provided between the two annular housings. Thus, when one is in the stable state (shown for the second magnet ring 20) the other is in the instable state (shown for the third magnet ring 70). Furthermore, the direction of rotation is opposite for the two annular housings and hence the two output shafts. Thus, the two output shafts may be arranged deliver equal and rotationally oppositely directed torques.

The advantage of this is that the torque needed to drive the input shaft to pull apart magnets of the first and second magnet rings is offset by a force of attraction between the first and third magnet rings. The torque needed to drive the input shaft is thus more uniform over time and is also reduced by offsetting the two magnetic couplings against each other.

Figure 8:
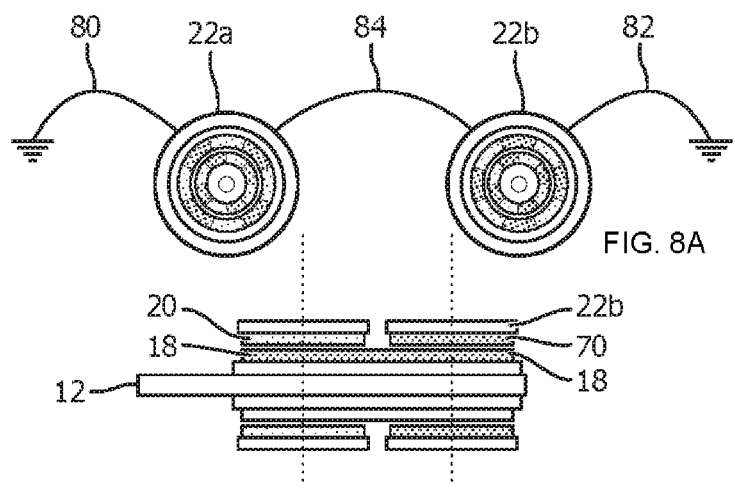
FIG. 8 shows how the arrangement of FIG. 7 may be coupled to an output load.

FIG. 8 shows how the arrangement of FIG. 7 may be coupled to an output load, which also provides the required coupling between the annular housings to maintain the desired phase relationship.

The output load provides a first coupling 80 between the first output shaft and mechanical ground, a second coupling 82 between the second output shaft and mechanical ground, and a third coupling 84 between the first and second output shafts. The coupling are represented as springs in FIG. 8.

Thus, both the first and second output shafts are for coupling to a load which limits the rotation of the first and second output shafts thereby to prevent unidirectional rotation of the first and second output shafts.

FIG. 9 shows different periods of time during the operation of the apparatus of FIG. 8.

FIG. 9 shows that the two output shafts 22a, 22b rotate in opposite directions, initially pulling apart and extending the third coupling 84 as shown in the top two images, and then rotating together and hence pulling on the first and second couplings 80, 82 as shown in the bottom image.

The output shafts exert torque on the spring system, trying to come to their preferred magnetic position. The symmetry of the spring system maintains the desired phase relationship between the rotation of the two annular housings.

The examples above all make use of concentric magnet rings. As mentioned above, ferromagnetic rings may be used, so that each concentric pair (in any of the examples above) may comprise one ring of permanent magnets and one ring of ferromagnetic poles.

FIGS. 10A and 10B show two examples. In each case, the inner ring is formed as a sequence of magnets with alternating poles, and the outer ring is formed as a ferromagnetic ring with projecting teeth which define ferromagnetic poles.

FIG. 10A shows narrow teeth and FIG. 10B shows wide teeth. The tooth design and the air gap size will influence the resulting torque curve. As for pairs of magnet rings, the magnetic field induced in the ferromagnetic ring will result in preferred default positions, and there will be a bias towards these default positions when the inner ring is rotated. The design of the rings may be used to select the number of default positions and the amplitude of the rotary reciprocating vibration. These design options will be apparent to those skilled in the art of motor design.

The magnet ring may of course be the outer ring and the ferromagnetic ring may be the inner ring.

The examples above all show an angular pole spacing in the two rings to be the same (or a multiple) so that there are positions in which all magnets of the magnet ring are in the zero torque position at the same time. However, this is not essential, and there may be different numbers of poles (even with no common factor at all) in the two rings. The design may be adapted to make a torque pattern which is a function of angular position rather than a regular sinusoidal torque pattern as shown in FIG. 2.

As explained above, one application of the invention is to provides a chest compression device.

FIG. 11 shows a chest compression device 100 comprising the apparatus 10 of FIG. 3, wherein the load is in the form of a chest compression belt 102 for mounting around the chest of a patient. an apparatus as defined above. The belt 102 is connected at opposite ends to the output shaft, in particular to the annular housing 22. The belt is used to generate pressure pulses in a body. The driving system makes a pulsating tensile force in the belt.

The two ends of the belt can be wrapped around one single rotor as shown in FIG. 10. However, it is also possible to use a double rotor magnet coupling, in which each of the two output shafts (in particular the annular housings) receives one end of the belt.

The apparatus for generating reciprocating motion will first wind up the belt until it is tight around the chest. Since in that stage there will be no counterforce from the chest, the outer magnets will follow the motor with the inner magnets. In the next stage, the belt will be tight around the chest and this will cause the outer magnets to slip and therefore cause a pulsating pulling force on the belt. This will not only vibrate the lung tissue, but will also get the pulsating air flowing in the air way. The vibration is necessary to loosen the bonds in the mucus and the airflow is necessary to transport the mucus towards the mouth.

A compact arrangement for the chest compression device is enabled, avoiding the need for a separate base station so the device can be directly located on the chest. It can be lightweight, small in size, and energy efficient. It may for example be battery operated.

FIG. 12 shows an example with a further output shaft 120 for delivering a second reciprocating rotary motion about the rotation axis, and the chest compression device then further comprises a second belt 112 connected at opposite ends to the further output shaft 120. This enables a second belt to be driven, by incorporating a further output shaft but sharing the same input shaft.

With two belts, there is better compensation for the chest shape. The belts will run at different diameters after the automatic winding around the chest.

In the case of two belts, the tightening force of each belt can be adjusted which could be a great benefit for women, for example with the upper belt covering their breasts set to a lower tightness.

If the friction between the body and the belt is a problem, the belt can be supplied with 'belt-body' interfaces.

Figure 13:
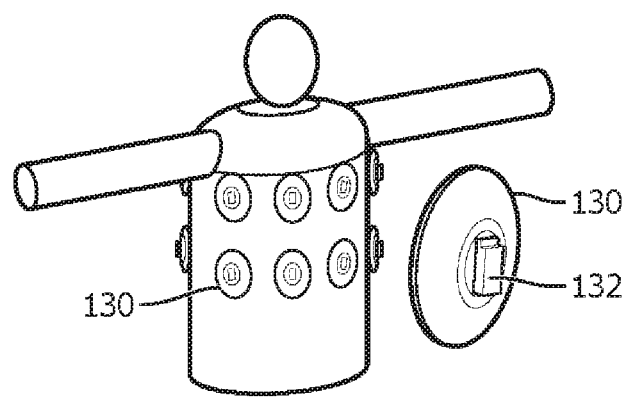
FIG. 13 shows interfaces for mounting between the belt and the body.

FIG. 13 shows an example of possible belt-body interfaces, in the form of soft pads 130 which touch the body. These may be used to filter out the peak of the force pulses. A ring 132 is provided in which the belt can easily slide.

These interfaces can be located at a specific position chosen by the user or where the most effect is expected. The interfaces guide the belt by means of a sliding bearing as shown in the figure below. Other bearing designs can also be applied (for instance ball bearings, roller bearings etc.). The reason for reducing friction is to avoid pinching on the skin and another advantage is that all interfaces operate at equal efficacy.

The properties of the interfaces 130 can be adapted in various ways; with different geometry and material (for dampening, stiffness or other properties). In particular, shear thickening material can be used, which adapts itself to an optimal mechanical coupling to the body, but yet ensures a stiff interface to optimally transfer high frequency force pulses.

The example above makes use of tightening or loosing of a belt to induce pulsating vibrations.

An alternative design instead makes use of local actuators around the belt. This arrangement may be considered to be a body manipulation device.

Figure 14:
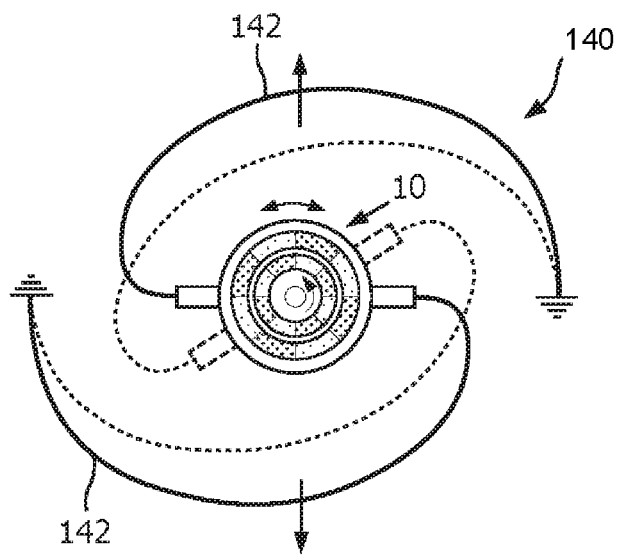
FIG. 14 shows a different design of actuator.

FIG. 14 shows one such actuator 140. The actuator comprises an apparatus 10 as discussed above, wherein the load comprises a pair of spring loads 142 connected to diametrically opposing locations of the output shaft, in particular the annular housing 22.

The spring loads 142 function as force applicators for applying a force to the subject. A set of the actuators may be formed around a belt or in a vest.

The springs are for example leaf springs which are wound up by the rotation of the motor (and thereby have a reduced outer diameter). When the second magnet ring slops, the springs are release (and thereby have an increased outer diameter) and they will generate a force towards the body.

Figure 15:
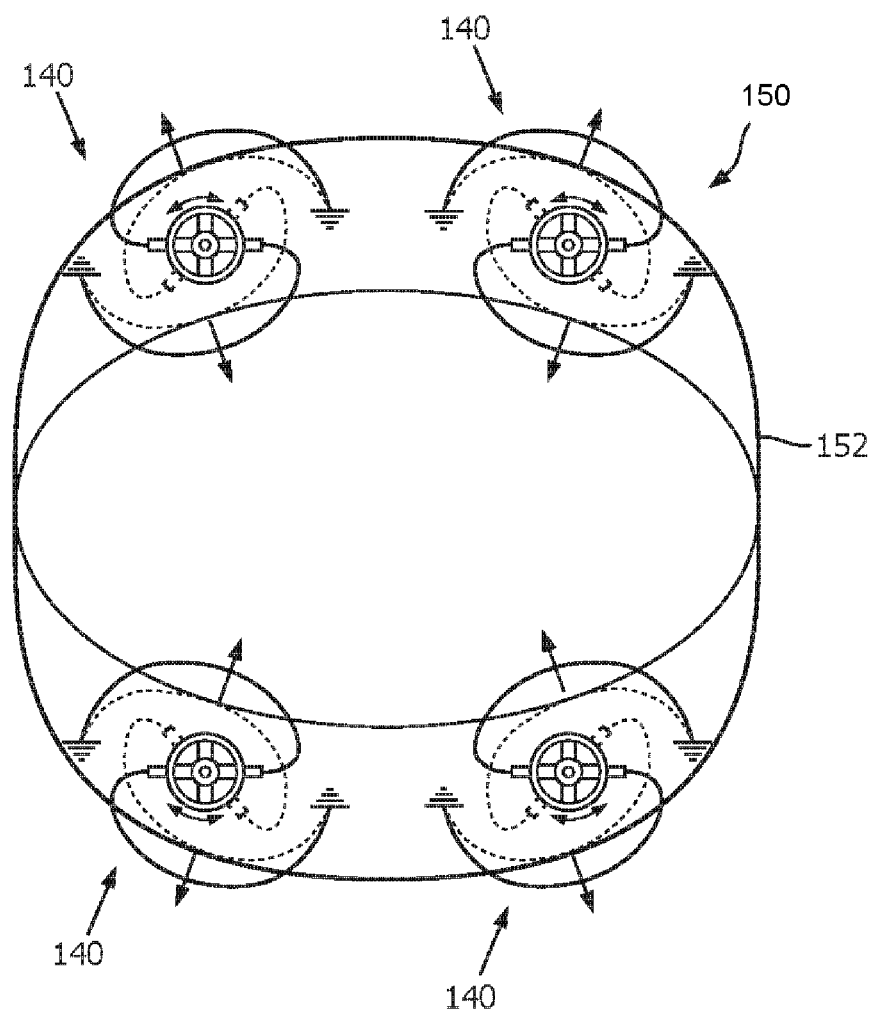
FIG. 15 shows an example of the body manipulation device with a set of four actuators of FIG. 14 surrounded by a belt.

FIG. 15 shows an example of the body manipulation device 150 with a set of four actuators 140 surrounded by a tight belt 152 to make sure the actuators direct the force towards the chest and not bounce up and down on the chest.

All actuators in this case will have a separate motor. In case of two belts, the actuators of the different belt in the same location can share a motor.

This arrangement makes it possible to locally choose the force intensity per actuator, where the first embodiment will equally divide the force of the actuator over the body or interfaces.

The various examples above share a common method of operation, which involves driving an input shaft with unidirectional rotation about a rotation axis, thereby rotating a first magnet ring, disposed about the rotation axis and comprising a first annular sequence of alternating magnetic poles. Rotation of a second magnet ring, disposed about the rotation axis and comprising a second annular sequence of alternating magnetic poles, is induced by magnetic coupling to the first magnet ring. Reciprocating rotary motion is then delivered about the rotation axis by an output shaft coupled to rotation of the second magnet ring.

The apparatus may be used in many devices, not only the chest compression devices shown. Examples are toothbrush actuators, teeth flossing devices, such as pumps for generation of a jet of liquid or air, skin care appliances, kitchen appliances, massage appliances such as heart massage devices.

The output shaft delivers reciprocating rotary motion about the rotation axis. The angular extent of this motion may be from very small (e.g. less than a degree) to a significant arc (e.g. 90 degrees or more). If a very small amplitude vibration is generated, the torque transferred may be relatively large, whereas when a large amplitude vibration is generated the torque transferred may be relatively small. Thus, the "rotary motion" generated may have a very small amplitude, and the design may be optimized for the delivery of motion or torque.

Reference is made to a belt in the description of a chest compression device. The belt may have any cross sectional shape and thus may be a loop of any shape. It may be circular (like a rope or cord) or wide and flat.

The examples above make use of magnet rings formed as an alternating sequence of north and south poles. However, each annular sequence of magnets may generate a more complicated magnetic field pattern, wherein the magnetic field direction and strength for each magnet is designed to achieve a desired characteristic of the resulting reciprocating motion. By adapting the magnetic field properties and air gap properties, the torque function may be modified to result in desired operating characteristics in response to a known load.

The system described above makes use of a drive motor for providing unidirectional rotation of the input shaft about the rotation axis. This means the rotation is in one rotational direction only during use of the apparatus. It does not necessarily need to be of constant speed or indeed to be continuous—it could in examples be pulsed.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. An apparatus for generating a rotary reciprocating motion, comprising:
   an input shaft having a rotation axis;
   a drive motor for providing unidirectional rotation of the input shaft about the rotation axis;
   an output shaft for delivering reciprocating rotary motion about the rotation axis, wherein the output shaft is for coupling to a load which limits the rotation of the output shaft thereby to prevent unidirectional rotation of the output shaft;
   the load being configured to impart a force application comprising pulsating vibrations to a subject;
   a first magnetic or ferromagnetic ring disposed about the rotation axis, rotationally fixed to the input shaft;
   a second magnetic or ferromagnetic ring disposed about the rotation axis, rotationally fixed to the output shaft, wherein the first and second rings are disposed one within the other around the rotation axis and wherein at least one of the first and second rings comprises an annular sequence of permanent magnetic elements; and
   a third magnetic or ferromagnetic ring, wherein the second and third rings are both disposed within or around the first ring,
   wherein the first and second rings define a coupling which is in anti-phase with a coupling defined by the first and third rings.

2. An apparatus as claimed in claim 1, wherein one or more of first and second rings comprise an annular sequence of permanent magnetic elements having an annular sequence of alternating magnetic poles.

3. An apparatus as claimed in claim 1, wherein:
   the first and second rings each comprise an annular sequence of permanent magnetic elements; or
   one of the first and second rings comprises an annular sequence of permanent magnetic elements and the other of the first and second rings comprises a sequence of ferromagnetic poles.

4. The apparatus as claimed in claim 1, wherein an axial relative alignment along the rotation axis, between the first and second rings, is adjustable to a desired relative alignment for setting an output torque level.

5. The apparatus as claimed in claim 1, wherein an axial relative alignment along the rotation axis, between the first and second rings, is set to a relative alignment for setting an output force level along the rotational axis.

6. The apparatus as claimed in claim 1, comprising a second output shaft, wherein the third ring is disposed about the rotation axis, is rotationally fixed to the second output shaft, and wherein the first and second output shafts are for coupling to the load which limits the rotation of the first and second output shafts thereby to prevent unidirectional rotation of the first and second output shafts.

7. The apparatus as claimed in claim 6, wherein the first and second output shafts are coupled together by a further load.

8. A chest compression device comprising:
   an apparatus for generating a rotary reciprocating motion, comprising:
      an input shaft having a rotation axis;
      a drive motor for providing unidirectional rotation of the input shaft about the rotation axis;
      an output shaft for delivering reciprocating rotary motion about the rotation axis, wherein the output shaft is for coupling to a load which limits the rotation of the output shaft thereby to prevent unidirectional rotation of the output shaft;
      a first magnetic or ferromagnetic ring disposed about the rotation axis, rotationally fixed to the input shaft; and
      a second magnetic or ferromagnetic ring disposed about the rotation axis, rotationally fixed to the output shaft,
      wherein the first and second rings are disposed one within the other around the rotation axis and wherein at least one of the first and second rings comprises an annular sequence of permanent magnetic elements; and a chest cpression belt for positioning around the chest of a subject, connected at opposite ends to the output shaft.

9. The chest compression device as claimed in claim 8, wherein:
the apparatus further comprises a further output shaft for delivering reciprocating a second rotary motion about the rotation axis; and
the chest compression device further comprises a second belt connected at opposite ends to the further output shaft.

10. The chest compression device as claimed in claim 8, further comprising a friction reducing arrangement between the belt or belts and the subject.

11. A body manipulation device comprising:
a set of apparatuses each as claimed in claims 1; and
a set of force applicators for applying a force to a subject, each force applicator being driven by an associated one of the apparatuses,
wherein each force applicator comprise a pair of spring loads connected to diametrically opposing locations of the output shaft.

12. A body manipulation device as claimed in claim 11, further comprising a belt around the set of apparatuses and force applicators.

13. A method of generating a rotary reciprocating motion, comprising:
driving an input shaft with unidirectional rotation about a rotation axis, thereby rotating a first magnetic or ferromagnetic ring, disposed about the rotation axis;
inducing rotation of a second magnetic or ferromagnetic ring, disposed about the rotation axis, by magnetic coupling to the first ring, wherein at least one of the first and second rings comprises an annular sequence of permanent magnetic elements;
delivering reciprocating rotary motion about the rotation axis of an output shaft coupled to rotation of the second ring; and
providing a chest compression belt for positioning around a chest of a subject, connected at opposite ends to the output shaft.

* * * * *